UNITED STATES PATENT OFFICE.

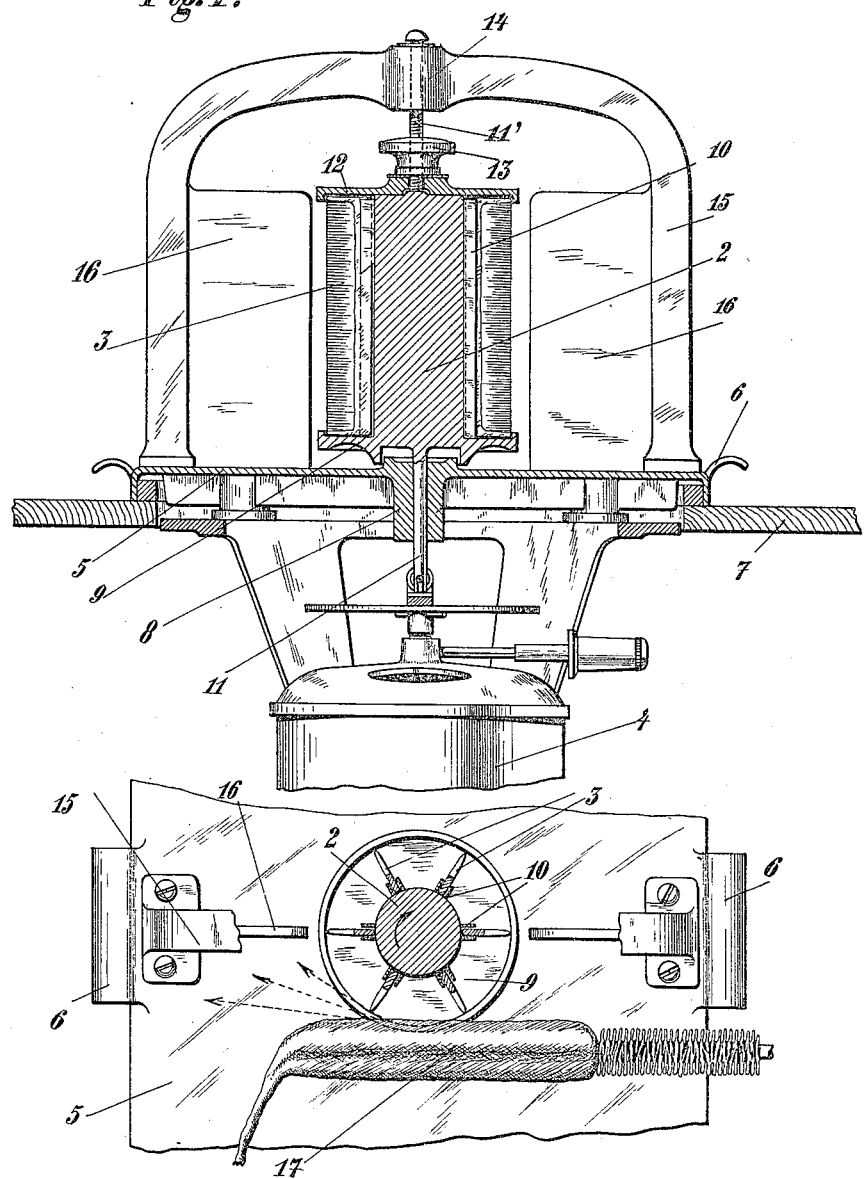

HERMANN EBERHARDT, OF BRESLAU, GERMANY.

PROCESS FOR CLEANING TUBULAR BODIES.

1,150,582.      Specification of Letters Patent.      Patented Aug. 17, 1915.

Application filed April 29, 1912. Serial No. 693,919.

*To all whom it may concern:*

Be it known that I, HERMANN EBERHARDT, a subject of the German Emperor, residing at Breslau, Germany, have invented a certain new and useful Process for Cleaning Tubular Bodies, of which the following is a specification.

Intestines have been rendered elastic for the purpose of cleaning by drawing them over an expansible body, the distension of which was brought about by means of liquid or air pressure. The impurities adhering to the outside of the intestines, more particularly pieces of fat and sinew, were scraped off, by quickly rotating brushes or knives. The scraping tools are, however, quickly covered with impurities, so that the work has to be frequently stopped for cleaning purposes. This drawback is obviated according to this invention by exposing the elastic intestines to the action of quickly rotating combs. The elastic state of the intestines is as essential as the use of combs, the cleaning of intestines, which are not made elastic, by quickly rotating combs, being just as unsatisfactory as cleaning elastic intestines by rotating brushes or knives. When the intestines are not made elastic there are formed creases which are inaccessible to cleaning and the wall of the material is frequently injured by the cleaning tools even when rotating combs are used; moreover the brushes are yielding and therefore yield to the impurities, rather than tear them off, while knives do not remove them completely but merely press the impurities flat against the wall of the intestine. If, however, the elastic intestine is cleaned by means of quickly rotating combs, first of all a complete separation of the impurities will be effected, as each of the many teeth not yielding in the direction of rotation of the comb engages with the impurities and tears them off, and moreover owing to the elasticity of the intestine its walls are not injured. The intestine is further accessible on all sides to cleaning and finally the combs always remain clean and suitable for working as the pieces of fat and sinews separated by the teeth of the same, are carried away by centrifugal force.

An apparatus suitable for carrying out the new process is illustrated by way of example in the accompanying drawing in which—

Figure 1 is a front elevation, and Fig. 2 a plan.

The stripping off combs 3 for instance six in number are arranged in a circle about a central roll or cylinder 2. The cylinder is connected to an electric motor 4 making about 1700 revolutions per minute. The cylinder is mounted at the top and at the bottom on pins 11 or 11', in bearings 8 or 14 of a frame 15, 5, the bottom plate 5 of which provided with handles 6, is used for securing the motor 4. For connecting the combs 3 to the cylinder 2, the latter is provided with projecting pairs of ledges 10 which form with each other a groove in which a comb is inserted; the said groove being covered at the end by the collar or flange 9 of the cylinder.

On the pin 11' of the cylinder is placed the covering plate 12 which rests on the top of the combs 3. By tightening the screw 13, the combs 3 are fixed firmly between the covering plate 12 and the flange 9 of the cylinder. In the central plane of the cylinder, plates 16 project from the stand 15, whereby the machine is divided into a front and back portion so that the attendants can work on either side.

When the motor 4 is switched in, the combs 3 begin to rotate quickly. Each attendant brings the elastic resilient portion of the intestines, for instance drawn over an elastic core 17, against the combs, pushing the intestines along the comb and at the same time moving them in order to bring every point into contact with the combs. The attendant moves the elastic core and intestines from the combs, draws the clean portion of the intestines along the elastic core and then cleans another portion.

In order to collect the impurities removed by the combs, the device is preferably placed in a trough open at the bottom, which is constituted by the plate 7 shown in the drawing.

What I claim as my invention and desire to secure by Letters Patent is:—

The process of cleaning intestines which consists in elastically distending the intestines and combing the so distended portions at a high speed.

In testimony whereof I have signed my name to this specification in the presence of two subscribing witnesses.

HERMANN EBERHARDT.

Witnesses:
  Mosko Finzi,
  Ernst Ketz.

Copies of this patent may be obtained for five cents each, by addressing the "Commissioner of Patents, Washington, D. C."